US008401195B2

(12) United States Patent
Fuchs et al.

(10) Patent No.: US 8,401,195 B2
(45) Date of Patent: Mar. 19, 2013

(54) METHOD OF AUTOMATICALLY POPULATING A LIST OF MANAGED SECURE COMMUNICATIONS GROUP MEMBERS

(75) Inventors: Kenneth C. Fuchs, Winfield, IL (US); Larry Murrill, Schaumburg, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 957 days.

(21) Appl. No.: 12/234,828

(22) Filed: Sep. 22, 2008

(65) Prior Publication Data

US 2010/0074446 A1 Mar. 25, 2010

(51) Int. Cl.
*H04L 9/00* (2006.01)
*H04L 9/08* (2006.01)
*H04L 29/06* (2006.01)
*H04L 9/32* (2006.01)
*G06F 21/00* (2006.01)

(52) U.S. Cl. ........ 380/278; 380/270; 380/277; 380/279; 713/151; 713/152; 713/158; 713/163; 713/170; 713/171; 713/182; 726/2; 726/3; 726/4; 726/6; 726/14; 726/26; 726/29; 726/30

(58) Field of Classification Search .................. 380/270, 380/277, 278, 279; 713/151, 152, 158, 163, 713/170, 171, 182; 726/2–4, 6, 14, 26, 29, 726/30
See application file for complete search history.

(56) References Cited

U.S. PATENT DOCUMENTS

| | | | | |
|---|---|---|---|---|
| 5,093,860 A | * | 3/1992 | Steinbrenner et al. | 380/273 |
| 5,173,938 A | * | 12/1992 | Steinbrenner et al. | 380/273 |
| 5,381,479 A | * | 1/1995 | Gardeck et al. | 380/273 |
| 5,402,491 A | * | 3/1995 | Locascio et al. | 380/273 |
| 5,481,610 A | * | 1/1996 | Doiron et al. | 380/270 |
| 7,266,687 B2 | | 9/2007 | Sowa et al. | |
| 7,620,824 B2 | * | 11/2009 | Iino | 713/194 |
| 7,643,817 B2 | * | 1/2010 | Klug et al. | 455/411 |
| 2002/0018571 A1 | * | 2/2002 | Anderson et al. | 380/277 |
| 2003/0133576 A1 | * | 7/2003 | Grumiaux | 380/279 |
| 2003/0235309 A1 | * | 12/2003 | Struik et al. | 380/278 |
| 2005/0246762 A1 | * | 11/2005 | Girouard et al. | 726/2 |
| 2006/0291664 A1 | | 12/2006 | Suarez | |

(Continued)

FOREIGN PATENT DOCUMENTS

WO WO2007008321 A2 1/2007

OTHER PUBLICATIONS

Baugher et al. "Multicast Security (MSEC) Group Key Management Architecture." RFC:4046, Apr. 2005.*

(Continued)

*Primary Examiner* — Christian LaForgia
*Assistant Examiner* — Kari Schmidt
(74) *Attorney, Agent, or Firm* — Anthony P. Curtis; Daniel R. Bestor

(57) ABSTRACT

Methods of automatically populating a secure group list in a key variable loader and of providing keys to a secure group are presented. After a user selects a secure group and encryption algorithm using inputs of the loader, the loader provides a group identifier and corresponding key for the group. The group identifier, encryption algorithm, and key are transmitted to a portable communication device over a physical connection between the two while a device identifier of the communication device is transmitted concurrently to the loader. The key variable loader automatically populates a stored list of subscribers of the group with the device identifier. When it is desired to transmit a new key to all of or fewer than all of the subscribers, one of the subscribers is connected with the loader and used to wirelessly transmit a new key to the remaining subscribers.

20 Claims, 9 Drawing Sheets

U.S. PATENT DOCUMENTS

| | | | |
|---|---|---|---|
| 2007/0035513 | A1 | 2/2007 | Sherrard |
| 2007/0157020 | A1 | 7/2007 | Lee |
| 2007/0274525 | A1* | 11/2007 | Takata et al. ................ 380/270 |
| 2008/0189297 | A1* | 8/2008 | Schultz .......................... 707/10 |
| 2009/0271612 | A1* | 10/2009 | Liu ............................... 713/151 |
| 2011/0135097 | A1* | 6/2011 | Redfern et al. ............... 380/279 |

OTHER PUBLICATIONS

PCT Search Report Dated Mar. 26, 2010.

Tomas Sanchez, et al. "Dynamic Context Networks of Wireless Sensors and RFID Tags", IEEE, Feb. 2007, pp. 59-64.

Lopez, et al. Dynamic Context Networks of Wireless Sensors and RFID Tags, AutoID Lab, Korea, ICU, Daejeon.

International Preliminary Report on Patentability and Written Opinion for International Patent Application No. PCT/US2009/054856 mailed on Mar. 31, 2011.

Canadian Office Action Dated Sep. 11, 2012 for Counterpart Application.

* cited by examiner

METHOD OF AUTOMATICALLY POPULATING A LIST OF MANAGED SECURE COMMUNICATIONS GROUP MEMBERS

TECHNICAL FIELD

The present application relates to secure communications. In particular, the present application relates to a method of automatically populating a list of managed secure communications group members.

BACKGROUND

Encrypted voice and data systems are well known. Many of these systems provide secure communication between two or more users by sharing the same encryption algorithm and one or more encryption key variables (keys), each of which is a number used to encrypt communications using a particular encryption algorithm. This permits only those users using the same encryption algorithm and knowing the key(s) to properly decrypt the secure communication. Encryption itself is performed on an end-to-end basis within a communication system, i.e., encrypting a message at the originating communication unit, passing the encrypted message through any number of channels and/or infrastructure to the end user's communication unit, which decrypts the message.

To provide encryption, a key management facility (KMF) is used to initially generate and manage the keys in the communication system. The KMF is typically a dedicated server that is housed in a secure location. As the KMF is stationary, a portable device called a key variable loader (KVL) has been developed to provide portability for key management. The KVL is physically connected to the KMF, where it is loaded with the encryption algorithm and key information from the KMF. Once loaded, individual devices are connected to the KVL to be loaded with the first algorithm and keys in an initial provisioning stage. During the initial provisioning stage, the KVL can be controlled manually by its user or act as a proxy for the KMF.

Most encryption algorithms support a number of keys as encryption algorithms are not often replaced in the field. The continuing use of one encryption algorithm over the course of time permits determination of the algorithm being used, leading to the possibility of unauthorized decryption if further security measures are not implemented. Thus, to retain security over a long period of time, the keys are periodically changed, typically weekly or monthly. This increases security as both the algorithm and the key must be divined by an unauthorized entity intercepting the encrypted message before decryption is possible. The KVL, after the initial provisioning of the devices, ensures that various devices are using the current encryption algorithm and keys by providing services such as over-the-air-rekeying (OTAR) in the wireless network.

More particularly, previously if it was unknown whether one or more of the devices in a group of devices was compromised, reprovisioning of the keys was performed by transporting the uncompromised devices of the group to the KVL location and again physically connecting them individually to the KVL. The new key supplants the previous key, thereby permitting only those devices containing the new key to communicate. Transporting the devices to be reprovisioned to the KVL location, however, is impracticable under circumstances in which many devices are to be reprovisioned (e.g., in one-to-many communications) or in cases in which one or more of the devices is remote. Further, physically connecting all of the devices individually remains burdensome and time consuming.

It is desirable to provide a less cumbersome method for distributing encryption keys to numerous widely-deployed devices in a communication system that utilizes End-to-End encryption.

BRIEF DESCRIPTION OF THE DRAWINGS

Embodiments will now be described by way of example with reference to the accompanying drawings, in which.

DETAILED DESCRIPTION

A key variable loader, a method of automatically populating the key variable loader, and a method of providing keys to a secure group are presented. The key variable loader has a memory, inputs, and a display. The memory stores security information including encryption algorithms and keys corresponding to the encryption algorithms, and lists of secure groups with associated security information. After a secure group and encryption algorithm is selected using the key variable loader inputs, the key variable loader provides a group identifier and corresponding key for the secure group. The group identifier, encryption algorithm, and key are uploaded to a portable communication device over a physical (or short range wireless) connection between the two while a device identifier of the communication device is concurrently downloaded to the key variable loader. The key variable loader automatically populates a list of subscribers of the secure group with the device identifier as well as a global list of all communication devices that have been connected with the key variable loader and have downloaded their device identifiers to the key variable loader. After the secure group has been initially provisioned with the key, it may be re-provisioned with a new key. This may occur at predetermined intervals, after a predetermined amount of wall clock time, or after one or more of the subscribers may have become compromised. When it is desired to transmit a new key to the uncompromised (or all) subscribers, one of the subscribers is connected to the key variable loader, the new key and, if desired, updated list of subscribers are uploaded to the connected subscriber, and the subscriber containing the new key wirelessly transmits the new key to the remaining subscribers.

Figure 1:
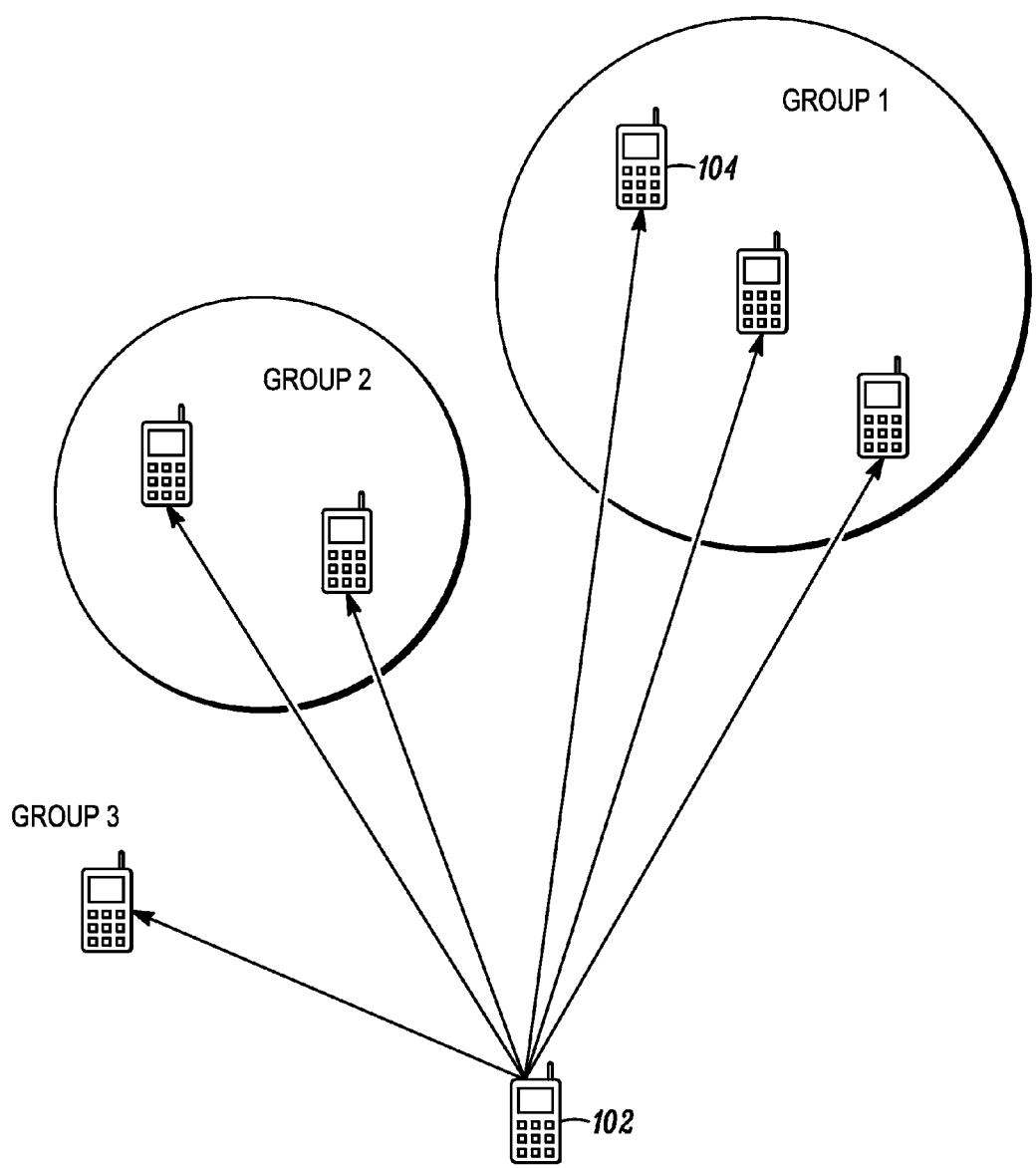
FIG. 1 illustrates one embodiment of a network.

One embodiment of a one-to-many network is shown in FIG. 1. Such a network may be, for example, a Public Safety network containing police, fire, emergency medical personnel, or military personnel. As shown, an end device 102 (transmitter) transmits an audio signal to one or more other end devices 104 (receivers) via wireless communication. Other elements of the network infrastructure such as managers, base stations, routers, repeaters et al. that may be disposed between the transmitter 102 and the receivers 104 (e.g., that in a switching and management infrastructure (SwMI) of the TETRA network) are not shown for convenience. The transmitter 102 and receivers 104 are portable devices such as push-to-talk (PTT) radios, laptop computers, personal digital assistants (PDAs), or cellular telephones that may be personally transported or vehicle mounted.

In one embodiment, the end devices 102, 104 can transmit messages to and receive unencrypted messages from all end devices 102, 104 that have selected the appropriate channel. In another embodiment, only end devices 102, 104 that are members of an established talk group and who have selected the appropriate channel are able to communicate. The end devices 102, 104 may belong to a mix of different talk groups such as public safety groups (police, fire, emergency medical personnel) or military personnel.

The end devices 102, 104 may also be subscribers of a security group called an over-the-air-radio group (hereinafter referred to as an OTAR group). Subscribers of the OTAR group contain the same encoding and decoding mechanisms (i.e., the same encryption algorithm and keys) to enable the members to communicate with each other when encrypted communications are desired. As above, the end devices 102, 104 may belong to a mix of different OTAR groups. In one example, a subscriber may belong to multiple military units such as platoons, squadrons, or units, each of which have a different OTAR group to which the subscriber belongs.

In an indirect communication mode, the transmitter initiates an encoded or unencoded communication signal (such as an audio signal) and sends the signal to a transmitter base station. The transmitter base station relays the signal to a controller/manager. The controller transmits the signal to a receiver base station, which in turn forwards the signal to the receiver(s) within its range. The receiver base station may be the same as or different than the transmitter base station. In a direct communication mode, the base stations and controller are eliminated and the end devices communicate directly without intermediaries. Direct communication is possible if the end devices are within communication range of each other.

Figure 2:
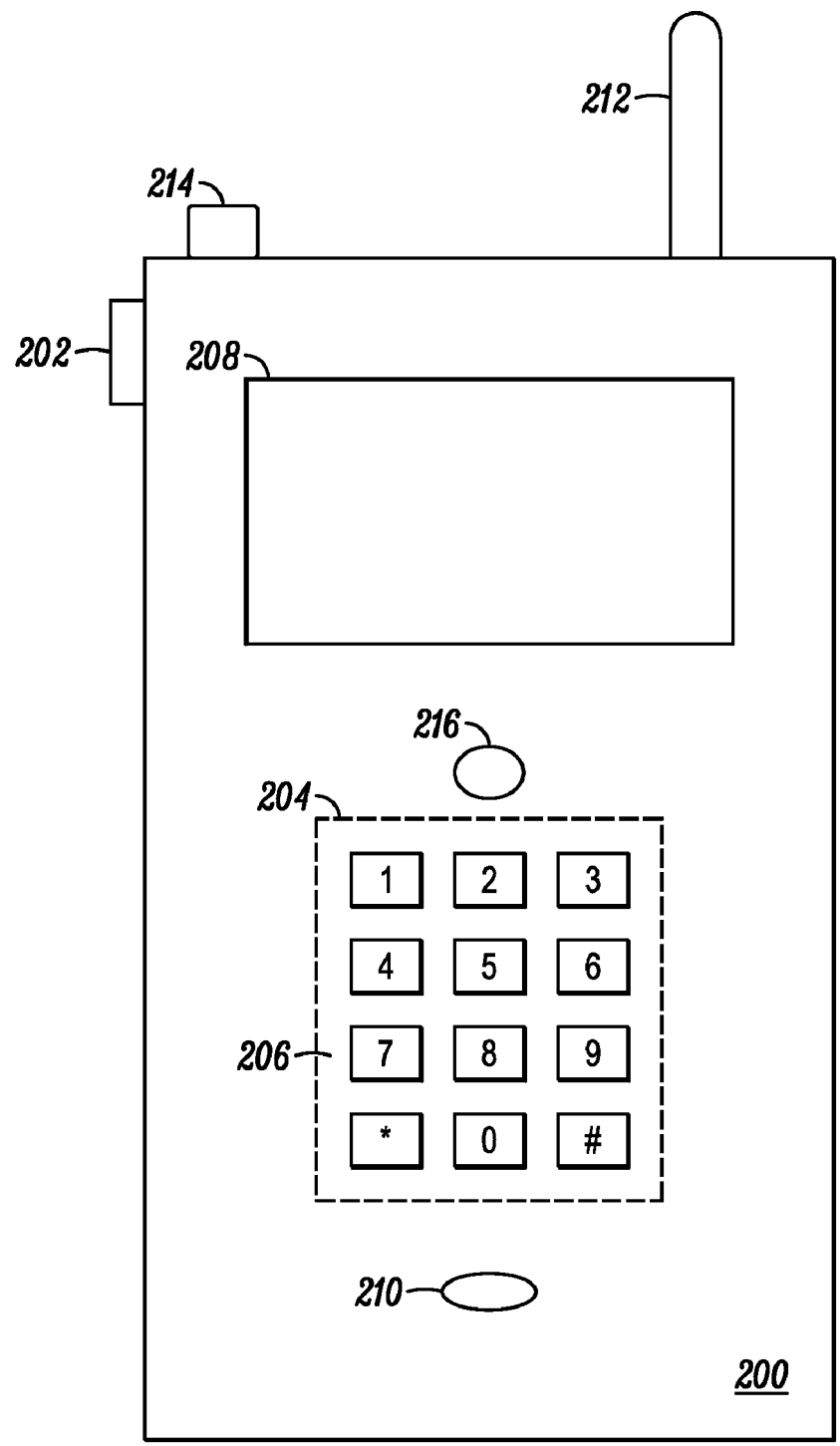
FIG. 2 illustrates an embodiment of an end device in the network of FIG. 1.

One embodiment of an end device used in the network of FIG. 1 is shown in FIG. 2. As shown, the end device is a PTT device 200. The PTT device 200 includes one or more of each of: a PTT button 202, an alpha-numeric keypad 204 containing keys 206, a display 208, a microphone 210, an antenna 212, a channel selector 214, a speaker 216, an I/O port 218, and, optionally, a touch panel (not shown). Placement of the various elements in the PTT device 200 as shown in the figure is merely exemplary. Although not shown, the PTT device 200 contains a processor and memory. The processor, among other functions, encrypts communications to and decrypts communications from other devices using the encryption algorithm and keys stored in the memory.

The PTT button 202 permits the handset 200 to initiate for example an audio signal (talkburst) when manually pressed and receive talkbursts when depressed. The keypad 204 (and touchpad if present) permits user input for various functions. The channel selector 214 is typically a knob that is turned to select one of multiple preset channels, thereby permitting communications with other end devices that have selected the same channel. The antenna 212 can be of any design to enable transmission and reception of wireless signals. The display 208 displays information such as transmitting/receiving group identification, transmission and reception frequencies, time/date, remaining power, incoming and dialed phone numbers, or information from the internet. The display 208 can be a color or monochrome LCD or OLED, for example. The I/O port 218 permits connection between the end device 200 and the key variable loader (KVL) 300 shown in FIG. 3.

Figure 3:
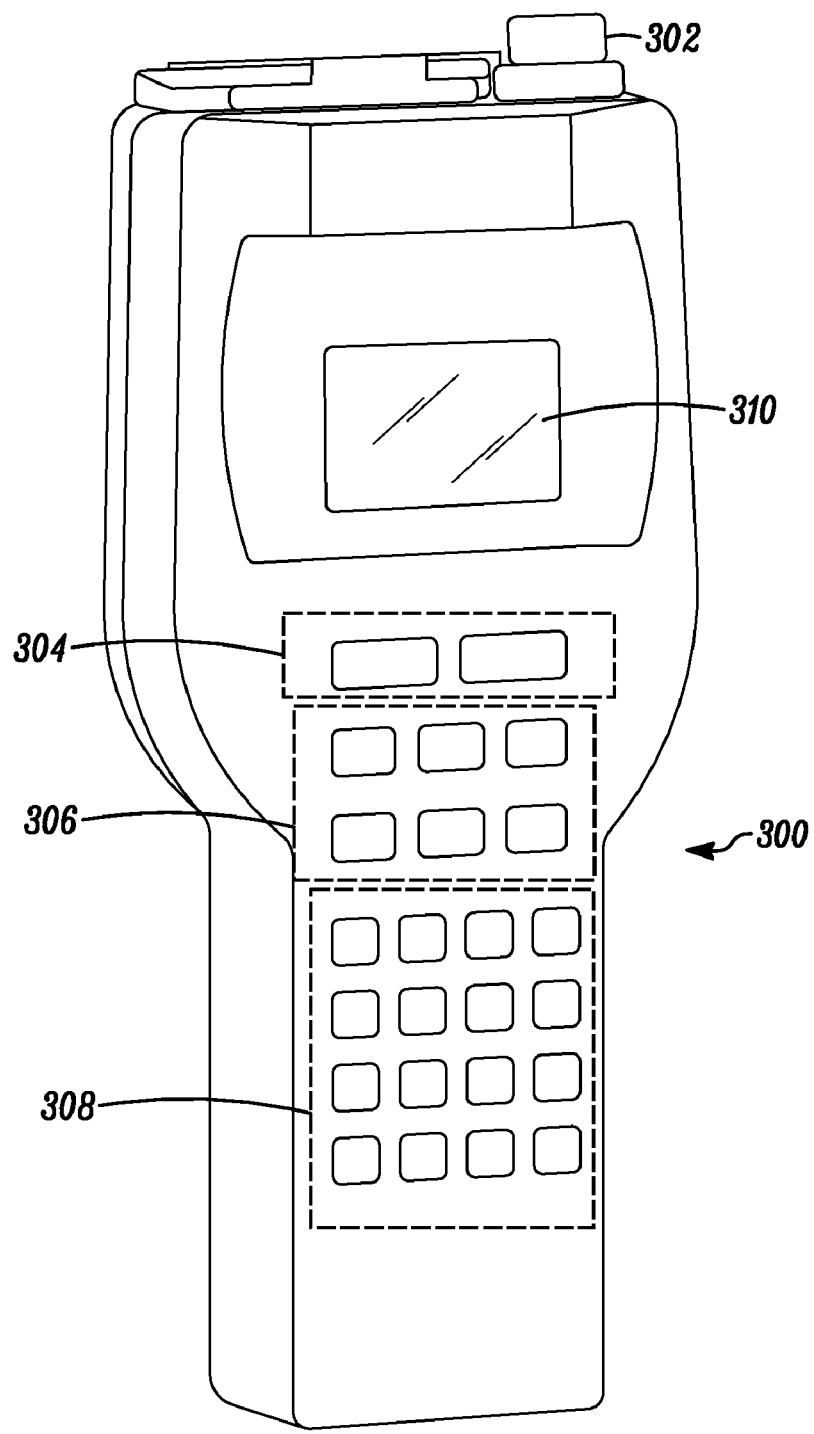
FIG. 3 illustrates an embodiment of a portable provisioning device.

One embodiment of a KVL is shown in FIG. 3. The KVL 300 contains an I/O port 302, an alpha-numeric keypad 308, a display 310, and, optionally, a touch panel (not shown). The I/O port 302 enables physical connection to a device for passing information therebetween. The display 310, as described in more detail below, shows different screens depending on the buttons/keys pressed on the KVL 300. The alpha-numeric keypad 308 contains both numerical and alphabetical buttons. In addition to the alpha-numeric keypad 308, a function keypad 306 on the KVL 300 provides buttons with predetermined functions. The buttons of the alpha-numeric keypad 308 and the function keypad 306 are hard keys, i.e., the function of the buttons is permanently defined (and labeled). The KVL 300 also contains soft keys 304 whose functions are defined by the screen currently being shown on the display 310. As in the PTT device 200 of FIG. 2, the placement of the various elements in KVL 300 as shown in FIG. 3 is merely exemplary.

The KVL 300 stores multiple types of encryption keys and enables provisioning of these keys for encoding and decoding messages communicated by the end devices. These keys include a Key Encryption Key (KEK), a Traffic Encryption Key (TEK), and a Signaling Encryption Key (SEK). The KEK is used to encrypt keys for transmission. The TEK is used to encrypt communication traffic, such as voice or data information. The SEK is used to encrypt the packets in which the encrypted keys or traffic are transmitted. Abbreviations such as TEK refer to a particular key being a tactical key, which is a key that is associated with a particular team.

One embodiment of series of screenshots provided on the display of the KVL for various functions are shown in FIGS. 4-7. In all screenshots in FIGS. 4-7, the lowermost text is disposed above soft keys of the KVL. To select the particular function described by the lowermost text in these figures, a soft key of the KVL corresponding to the appropriate position under the screen is actuated. In these figures, the screenshots are indicated by reference numerals and transitions between screenshots are indicated by arrows. The ◄ and ► on line 3 of certain screenshots permit scrolling through menu items in that screen. A field preceded by ► is an element in a list (even if it is the only element) that the user may scroll through. Similarly, symbol > precedes a field when it is currently being created, e.g., Group name, while the symbol : is an indicator that a certain entry has been selected, e.g., selecting a group after scrolling through the list. Display of the different screens, transitions between screens, data entry, and/or accepting or rejecting such data may each be accompanied by audio or tactile feedback. This feedback may be, for example, the same for each action for which feedback is provided, different for each action, or the same for each type of action (e.g., acceptance) but different for different types of actions (e.g., acceptance vs. display).

Figure 4:
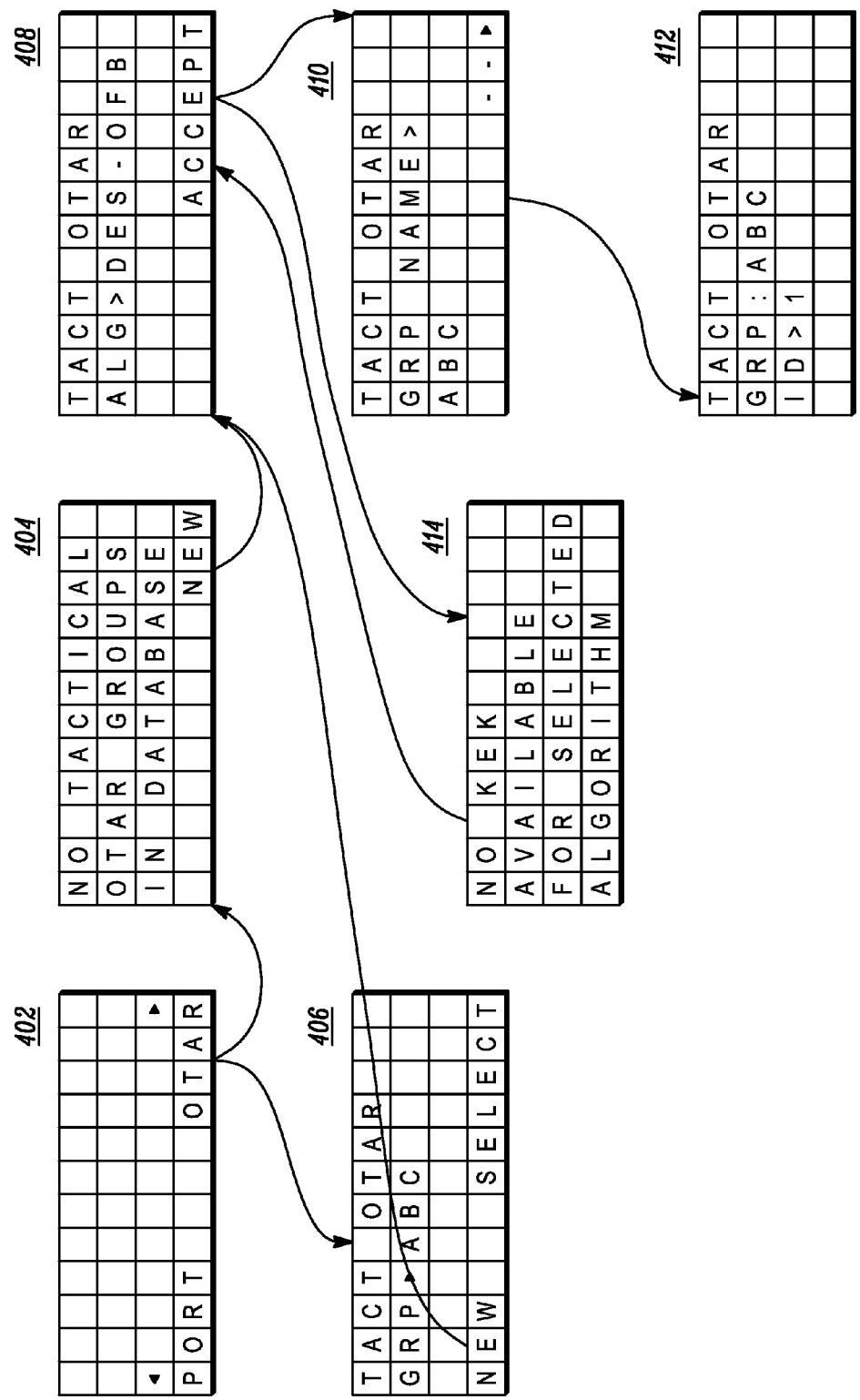
FIGS. 4 and 5 illustrate an embodiment of screenshots during creation of an OTAR group.

Screenshots illustrating creation of a tactical OTAR group (an OTAR group created remotely by the KVL rather than an OTAR group created by a KMF) is illustrated in FIG. 4. Before creation, an initial KVL screen 402 shows an OTAR function above one of the keys. Note that the PORT function will be ignored in these descriptions. When the OTAR function is activated, the screen changes to indicate either that no tactical OTAR group (hereinafter merely referred to as an OTAR group) is stored in a no-OTAR-group screen 404 or to allow the user to select or create a new OTAR group in an OTAR-selection screen 406. The latter screen 406 may display no OTAR groups, the first OTAR group in a list of OTAR groups stored in the KVL, the last OTAR group selected, the last OTAR group created, the OTAR group selected most often, or one or more OTAR groups based on any desired criteria. Although not described later, this or another display criterion may be followed when modifying the subscribers in a selected OTAR group.

Once creation of a new tactical OTAR group is selected in screen 404 or 406, the user selects an encryption algorithm to use for the tactical OTAR group being created 408. The encryption algorithm selected may be stored in the KVL or may be stored in the device to which the KVL is or will be attached. The KVL and/or devices stores one or more encryption algorithms. As before, the encryption-algorithm-selection screen 408 may display the first encryption algorithm in a list of encryption algorithms stored in the KVL, the last encryption algorithm selected, the encryption algorithm selected most often, or one or more encryption algorithm based on any desired criteria. The encryption algorithm may be selected by any desired input device on the KVL including a scroll wheel or knob, a touch screen, or hard keys. One of the soft keys below the encryption algorithm selection screen 408 permits the user to accept the encryption algorithm selected.

If no KEK is available for the encryption algorithm selected, a no-available-KEK screen 414 is displayed. In this case, as in other screens in the figures that do not contain the ability to input via the soft keys, the screen is displayed for a predetermined amount of time before transitioning to the next screen. The display time period may be set by the user utilizing a particular KVL screen or may be preset in manufacturing the KVL and may be different for different transitional screens. In other embodiments, for an OTAR group to be defined, the database contains at least 2 keys—TKEK, TSEK/TTEK for the algorithm selected, otherwise the no-available-key screen 414 is displayed seen. In this embodiment, the KEK shown in FIG. 4 is replaced with SEK/TEK.

If keys are available for the encryption algorithm selected, a group-name screen 410 is displayed. The user enters a name for the new OTAR group being created using the keyboard and enters the name by actuating the appropriate soft key. If the name is already being used, a name-already-being-used screen (not shown) may be displayed for the predetermined amount of time before redisplaying the group-name screen 410.

Figure 5:
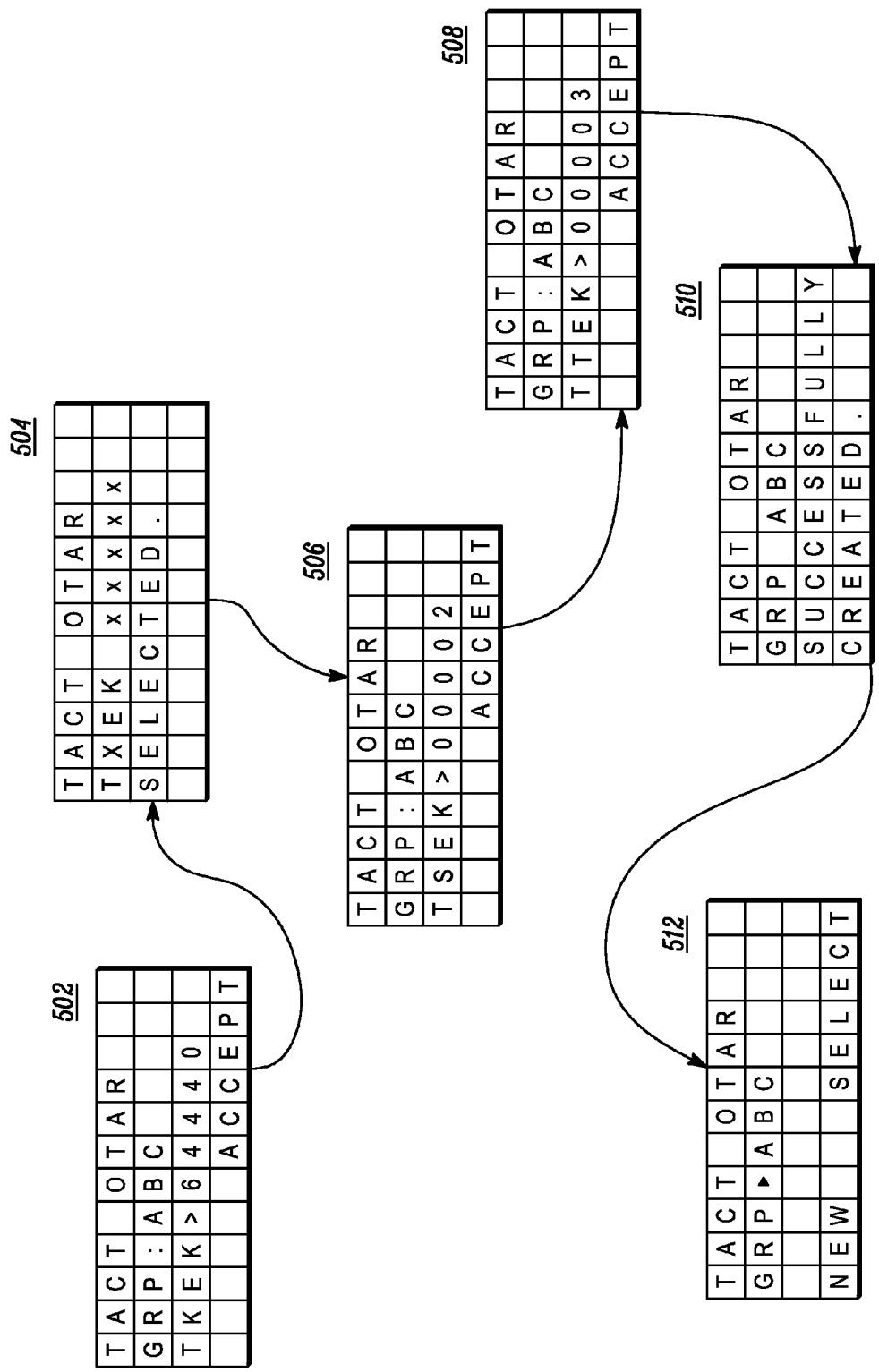

Once the tactical OTAR group name has been accepted, the group-ID screen 412 is displayed for the predetermined amount of time before transitioning to the next screen, which is displayed in FIG. 5. The group ID is a number used during the communication while the group name is the name identifying the group for the user. Although the two are synonymous, the use of a name enhances user experience by making it easier for a user to remember particular groups by name than by number.

Turning now to FIG. 5, the creation of the new group continues. After the time period ends during which group-ID screen 412 is shown, the TKEK-selection screen 502 is displayed. As shown, during display of this screen 502, a desired TKEK can be selected, e.g., by scrolling through various TKEKs or entering a particular TKEK on the keyboard. Once the TKEK is entered, the TKEK can be accepted by activating the appropriate soft key. Once accepted, a transitional screen in which the TKEK is indicated as being selected 504 is displayed for the predetermined amount of time.

The TSEK and TTEK are next selected using TSEK-selection and TTEK-selection screens 506, 508 with transitional screens (not shown). The TSEK and TTEK are selected in the same manner as the TKEK. The order of key selection in FIG. 5, may be altered to be in any order as desired.

After all of the keys have been selected, a transitional screen indicating that the new OTAR group has been successfully created 510 is displayed for the predetermined amount of time. This transitional screen 510 then yields to the OTAR-selection screen 512 (shown as screen 406 in FIG. 4), where the newly created group or another existing group can be edited or a new group can be created.

Figure 6:
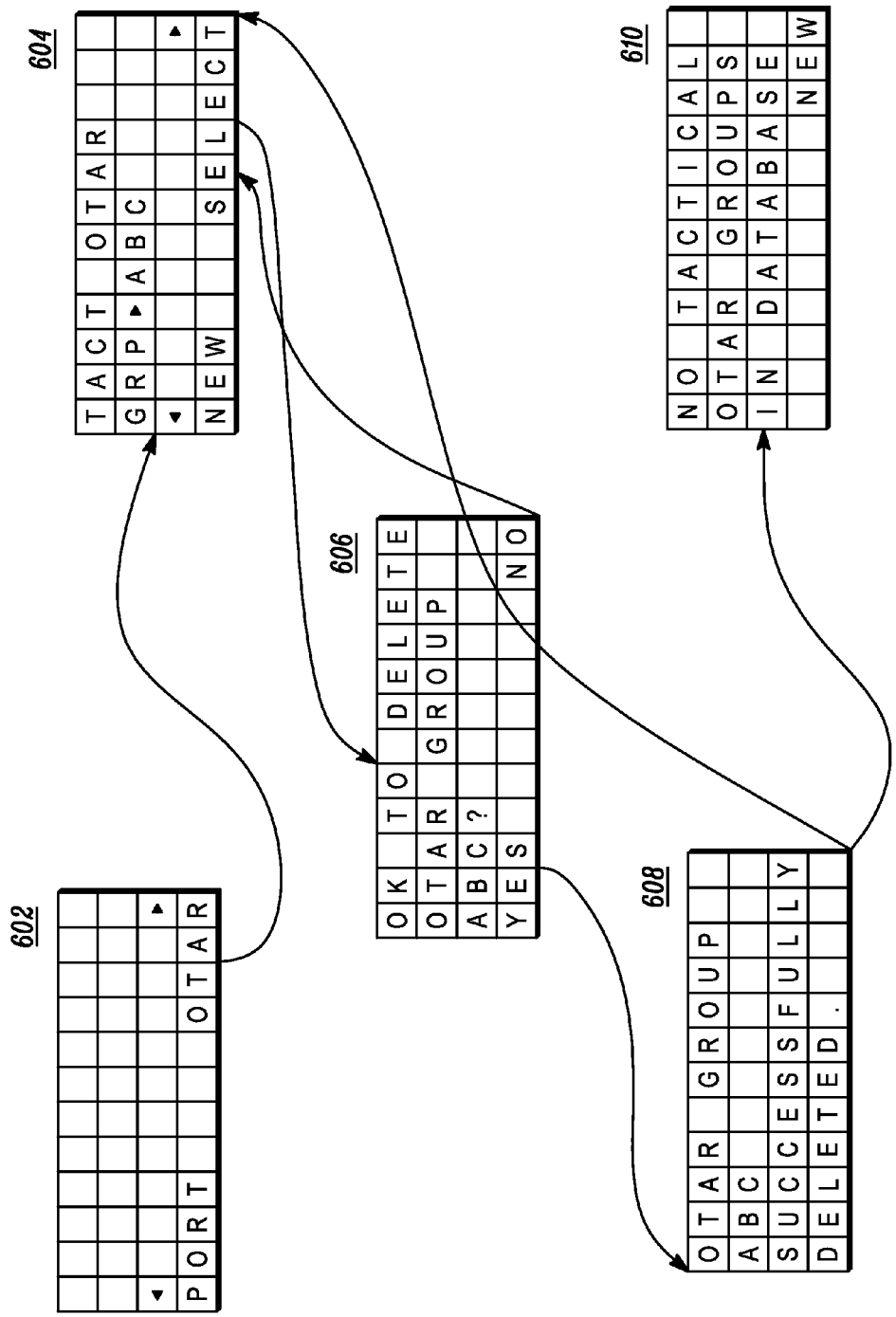
FIG. 6 illustrates an embodiment of screenshots during deletion of an OTAR group.

FIG. 6 illustrates a series of screenshots for deletion of an OTAR group. As in the creation screenshots of FIGS. 4 and 5, the initial screen 602 and OTAR-selection screen 604 are first displayed. A particular OTAR is entered in the OTAR-selection screen 604 and this OTAR is selected by activating the appropriate soft key. A deletion-confirmation screen 606 is then displayed by scrolling using the ◄ or ► on line 3. The deletion-confirmation screen 606 provides the ability to confirm or deny deletion of the selected OTAR group using the soft keys. If confirmation of the selection is denied, the display reverts to the OTAR-selection screen 604. If the selection is confirmed, a transitional screen 608 indicating that the OTAR group was successfully deleted is displayed for the predetermined amount of time. After the predetermined amount of time, the display reverts to the OTAR-selection screen 604 if other OTAR groups are present in the KVL or to the no-OTAR-group screen 610 (shown as screen 404 in FIG. 4).

Figure 7:
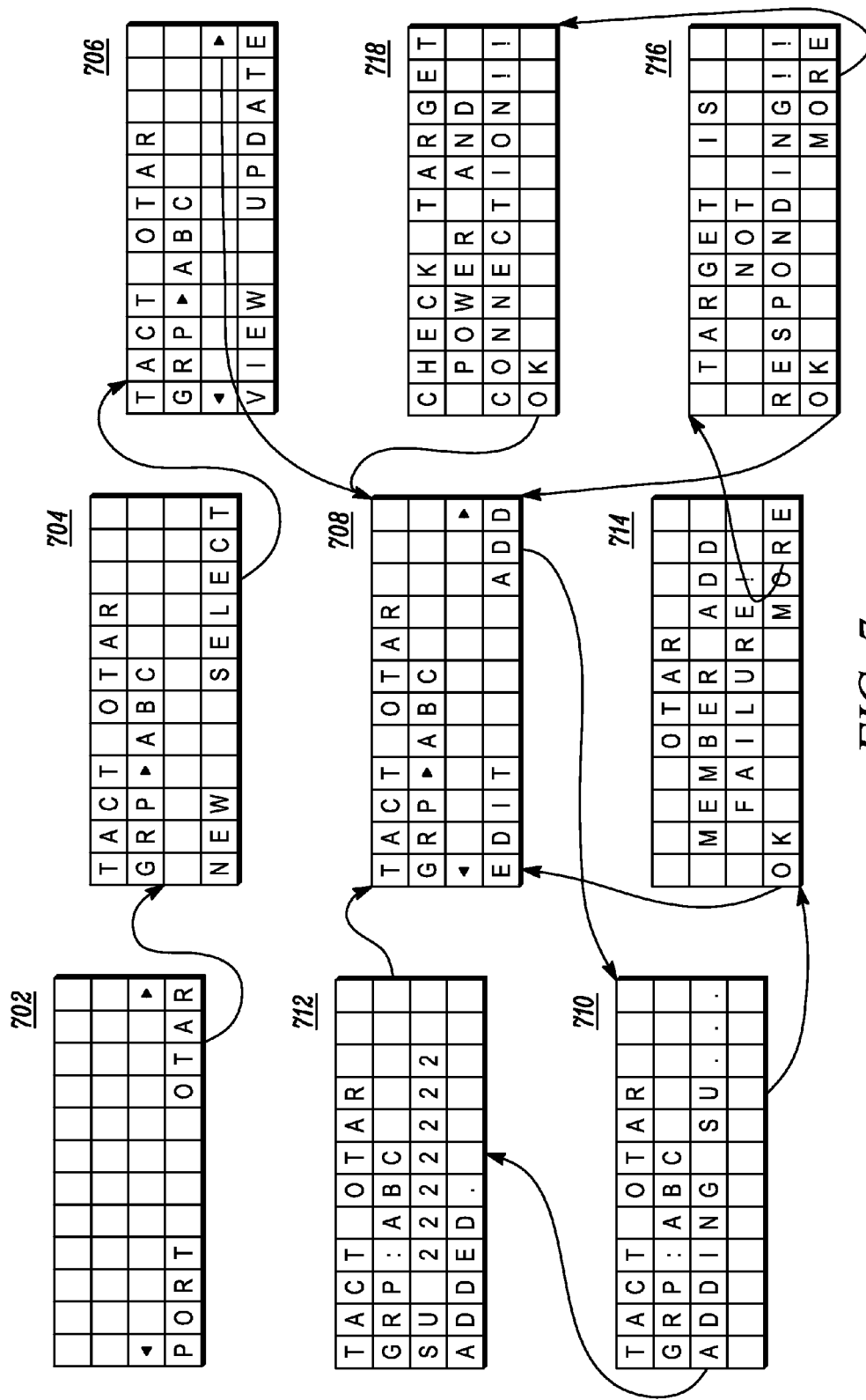
FIG. 7 illustrates an embodiment of screenshots during addition of a member to an OTAR group.
Figure 8:
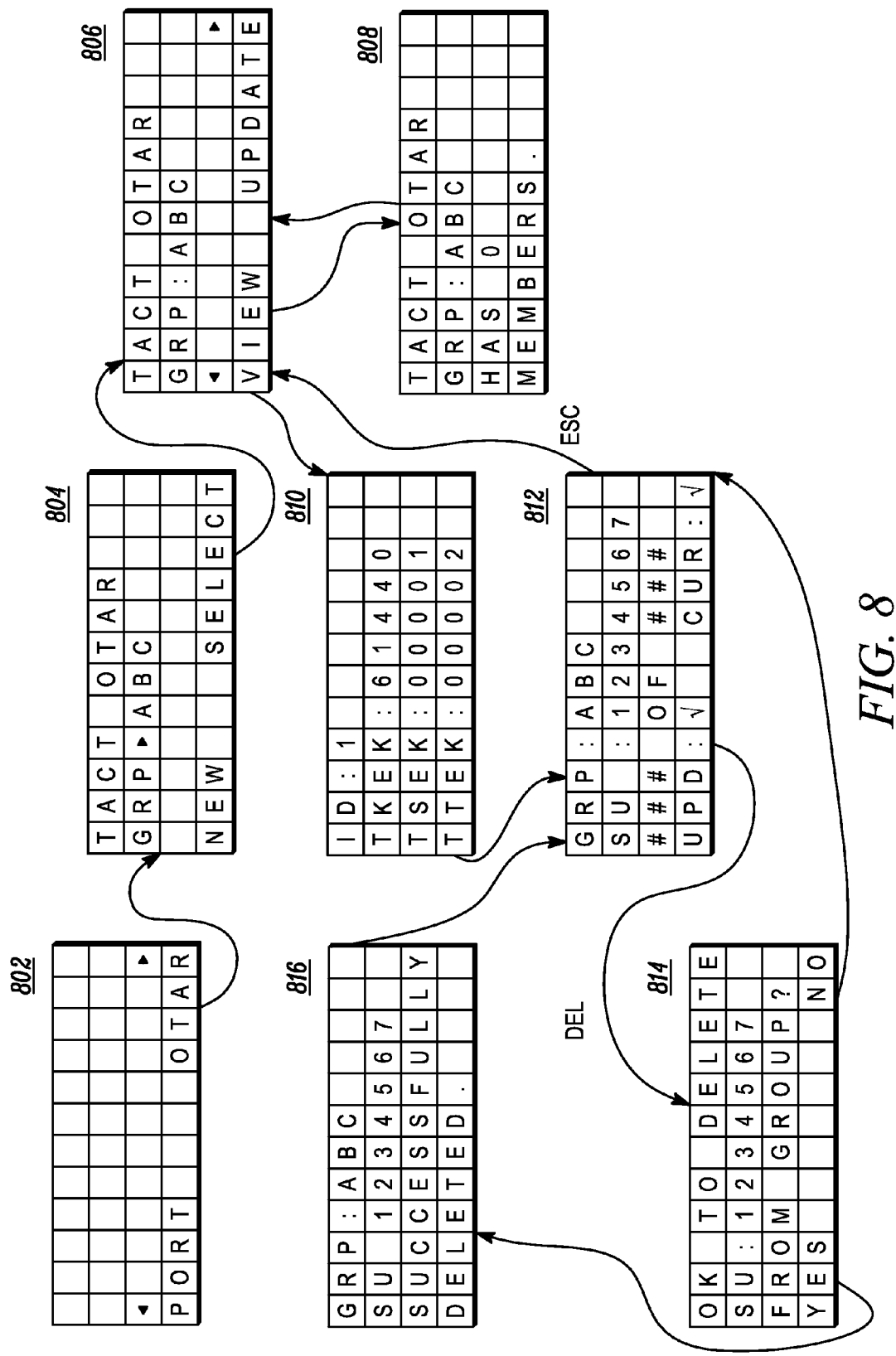
FIG. 8 illustrates an embodiment of screenshots during viewing and deletion of a member in an OTAR group.

The KVL is also used to add a subscriber (i.e., device) to a particular OTAR group. The screenshots for adding a subscriber are shown in FIG. 7. Similar to the above processes, the initial and OTAR-selection screens 702, 704 are first displayed. A particular OTAR is entered in the OTAR-selection screen 704 and this OTAR is selected by activating the appropriate soft key. Once the OTAR-selection has been selected, an OTAR-selected screen 706 is displayed by scrolling as indicated by the ◄ or ► on line 3. The OTAR-selected screen 706 permits viewing or updating of the selected OTAR group dependent on the soft key that is activated. Viewing of the selected OTAR group permits the KVL user to see characteristics of the selected OTAR group, such as the number of subscribers, one or more IDs of the subscribers, and permissions for various group functions among others. Viewing screenshots are illustrated in FIG. 8.

Once the OTAR group has been selected for update and the appropriate soft key activated, the main update screen 708 is displayed. The main update screen 708 indicates the selected OTAR group and provides the ability of the user to edit or add a subscriber using different soft keys. When the add soft key is actuated, the KVL searches for a physically connected subscriber, and an attempted-adding screenshot 710 is temporarily displayed. The attempted-adding screenshot 710 illustrates the OTAR group and the fact that the KVL is attempting to add a subscriber.

For the KVL to successfully add a subscriber, the subscriber and the KVL are physically connected. The KVL displays the attempted-adding screenshot 710 for a set amount of time, which is determined by the amount of time it takes to pass a desired set of information between the subscriber and the KVL as well as a set number of retries in case the information fails at first to be transmitted between the two. Any number of retries, including none, may be permitted as desired. The physical connection provides security when initially adding/establishing keys for storage in the subscriber. The information includes key (and possibly encryption algorithm) information being transmitted to the subscriber and identification information of the subscriber being transmitted to the KVL.

If the information is successfully transmitted between the subscriber and the KVL, a subscriber-unit-added screen 712 is temporarily displayed. The subscriber-unit-added screen 712 shows the OTAR group and the ID of the subscriber that has been successfully added before transitioning in the predetermined amount of time to the main update screen 708.

If the information is not successfully transmitted between the subscriber and the KVL, a subscriber-unit-addition-failure screen 714 is displayed. The subscriber-unit-addition-failure screen 714 permits activation of two soft keys. One of the soft keys transitions to the main update screen 708 without providing further information. Immediate transition may be selected by the user if the problem or solution is apparent (e.g., a subscriber is not connected or is powered down). If more information is desired, the appropriate soft key may be actuated to indicate, in a failure-info screen 716, the cause of the failure for example that the subscriber is not responding. The failure-info screen 716 again permits activation of two soft keys. One of the soft keys transitions to the main update screen 708 without providing further information. The other soft key when actuated brings up a solution screen 718, which describes possible solutions to the problem (as shown, to check the power of the subscriber and the connection between the subscriber and the KVL). By actuating a soft key defined by the solution screen 718, the main update screen 708 is once again displayed.

FIG. 8 illustrates screenshots for viewing and deleting subscribers from a particular OTAR group. Similar to the above processes, the initial and OTAR-selection screens 802, 804 and OTAR-selected screen 806 are displayed. When viewing rather than updating is selected using the soft keys defined by the OTAR-selected screen 806, if the OTAR group is empty, an OTAR-empty screen 808 is displayed for the predetermined amount of time before returning to the OTAR-selected screen 806. If the OTAR group has one or more subscribers, the OTAR group ID and keys being used is displayed in an OTAR-info screen 810 for the predetermined amount of time before transitioning to a main member-info screen 812.

In the main member-info screen 812, the OTAR group is shown, as is the particular subscriber. The number of subscribers that belong to the OTAR group along with the number of the particular subscriber in a numerical list of the subscribers may also be displayed (e.g., 3 of 32). Arrows may be used to scroll through the numerical list. The main member-info screen 812 may also display information such as whether the particular member has been updated (shown as UPD in FIG. 8) or is current (shown as CUR in FIG. 8) by displaying different indicators adjacent to the respective symbol UPD or CUR. In one example, if the KVL determines that last update attempt was successful, a check mark is shown next to UPD whereas if it determines that the update failed, an "x" mark is shown next to UPD. The CUR indicates that the KVL believes that the particular OTAR group member has the right TTEK. Thus, if the KVL determines that the OTAR group has the correct TTEK, a check is displayed next to CUR whereas if it determines that the OTAR group has the incorrect TTEK, an "x" is displayed next to CUR. Once the desired member has been found or not found, soft or hard keys may be provided to return to OTAR-selected screen 806 (e.g., as shown by actuating an "ESC" hard key of the KVL) if desired. Similarly, once a particular member has been found, soft or hard keys may be provided to transition from the main member-info screen 812 to a member-deletion screen 814 (e.g., as shown by actuating a "DEL" hard key of the KVL) if desired. The member-deletion screen 814 permits confirmation of deletion of the subscriber from the OTAR group to be supplied by the user. If the user does not wish to confirm deletion of the subscriber from the OTAR group, the user actuates a soft key representing denial of confirmation and the KVL returns to the main member-info screen 812. If the user confirms deletion of the subscriber from the OTAR group in the member-deletion screen 814 by actuating a soft key representing the confirmation, a member-deletion-confirmation screen 816 is displayed for the predetermined time period and the KVL then returns to the main member-info screen 812. The main member-info screen 812 is updated to reflect the deletion of the subscriber from the OTAR group by replacing the subscriber previously shown with another member of the OTAR group (e.g., numerically next to the deleted member) as well as updating the number of members and position of the now-displayed member of the OTAR group.

Thus, as described in the previous figures, OTAR groups can be created and deleted, and membership within the group can be changed using the KVL. The KVL supports centralized key distribution without an infrastructure such as a KMF and various intermediaries. This enables a user to efficiently rekey tactical groups of radios where no infrastructure exists.

To effect key distribution, the KVL is physically connected directly to one of the subscribers of the desired OTAR group (or a device to be added to the OTAR group). By providing the security information (e.g., encryption algorithm, keys) over a physical rather than wireless connection, the security information. The physical link can be any short range data connection, such as a Point-to-Point Protocol (PPP) or Universal Serial Bus (USB) connection and may provide power to the connected device as well as a conduit path for information therebetween. The connected device then distributes the new keys wirelessly to the other subscribers of the OTAR group defined by the KVL and of which the connected device is a subscriber.

Figure 9:
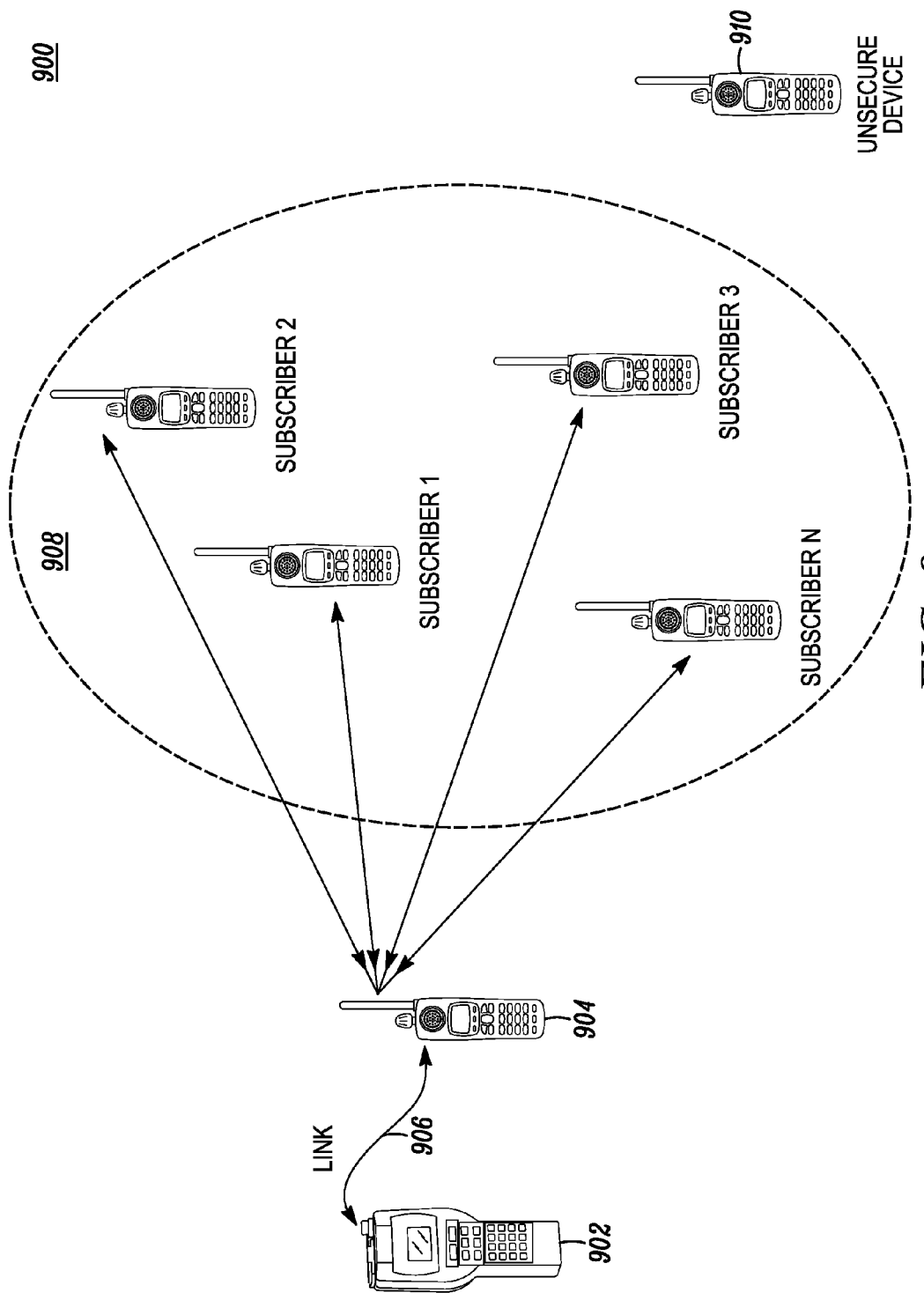
FIG. 9 illustrates an embodiment of updating keys in an OTAR group using the KVL and a member of the OTAR group.

Such a system is shown in FIG. 9. In the system 900, the KVL 902 is connected to the connected subscriber 904 through a physical link 906. The connected subscriber 904 and KVL 902 exchange information such as the ID of the connected subscriber 904, the ID of the OTAR group 908 to which the connected subscriber 904 is to be transmitting the new key(s), and the subscribers of the OTAR group 908 that are to receive the new key(s). This permits the connected subscriber 904 to initiate a communication to the other subscribers of the OTAR group 908, sending the new key(s) to only those subscribers that are known to be secure. This communication can be a direct communication, if all subscribers are within range of at least one of the other subscribers, or an indirect communication. The communication can be initiated automatically by the connected subscriber 904 after it receives the new key information, automatically in response to a command from the connected KVL 902, or manually after the key information has been transmitted from the KVL 902 to the connected subscriber 904. In one example, if it is unknown as to whether one or more of the OTAR group 908 subscribers have been co-opted by parties that are not supposed to have possession of the devices, the KVL 902 can be used to delete these unsecure devices 910 from the OTAR group 908 so that the connected subscriber 904 transmits the key(s) to only the remaining subscribers of the OTAR group 908.

In other embodiments, the connected subscriber 904 may be initially connected to the KVL 902 for information transfer and then disconnected. Later, when the connected subscriber 904 is reconnected to the KVL 902, the KVL 902 can then instruct the connected subscriber 904 to transmit the key(s) to the appropriate subscribers of the desired OTAR group 908.

In some embodiments, the connection between the KVL and the device is a wired connection rather than a wireless connection to provide a substantial amount of security. In one such embodiment, the KVL or the connected device contains security enablement that permits transmission of information between the KVL and the connected device only when a wired connection is present between the two. In other embodiments, such security enablement is not present.

As the subscriber information is passed to the KVL over the wired connection at the same time that information from the KVL is being passed to the subscriber, this permits the KVL to automatically populate a list of all devices that have been physically connected to the KVL, as well as to automatically populate and update lists of which devices are subscribers of which OTAR groups. This permits automatic generation of a global list of devices associated with the KVL as well as automatic generation of lists of all subscribers for each OTAR group along with the associated security information. Note that different OTAR groups in the KVL may contain overlapping subscribers. Automatic population by the KVL of the various lists in the KVL avoids the laborious and time-consuming manual entry that usually accompanies population of OTAR groups. Manual entry is achieved using the KVL keyboard and thus a cumbersome process when used to enter the information of each device in an OTAR group, which may typically have a relatively large (50-500) number of subscribers. Thus, automatic population is provided by software in the processor and memory without manual entry of identifying data of the connected device.

In addition to merely transferring information of the individual subscriber, OTAR group information can be transferred as well. For example, if new OTAR groups are formed by the subscriber prior to connection or existing OTAR groups are eliminated, the OTAR group information can be passed directly to the KVL through the physical link between the two to automatically populate the group information.

Once these lists are populated in the KVL, they are alterable in the KVL. For example, a subscriber can be removed from the OTAR groups of which it is a member. This permits new keys to be distributed quickly and easily using these populated lists and allows for rapid (effectively simultaneous) distribution of keys to the subscribers, significantly reducing the time it takes to load new keys into all subscribers in the OTAR group. Each OTAR group is established for the express purpose of disseminating key information to a different set of subscribers. Thus, the portable KVL not only performs the initial key provisioning, it also manages the OTAR groups and performs various OTAR operations. In one embodiment, the OTAR groups and subscribers are exclusively managed by the KVL. Therefore, there is no interoperation and no interference with any other OTAR management device.

In summary, one embodiment in which automatic provisioning is effected is as follows. An OTAR group is constructed in the KVL using the graphics unit interface of the KVL. Each subscriber is sequentially attached to the KVL. While the subscriber is physically attached to the KVL, initial keys in the KVL are transferred to the subscriber. During the same connection, identification information of the attached subscriber is transferred to the KVL. The KVL then associates the identifying information with the OTAR group, populating the OTAR group automatically without manually inputting the data in the KVL about the attached subscriber. This list can be viewed or altered as desired and is automatically retrieved during the process of provisioning with new keys. New keys can be distributed wirelessly to only desired OTAR subscribers using one of the subscribers, which is again attached to the KVL.

In certain embodiments, one or more authentication mechanisms can be used to permit alteration of data within the KVL or to update security information in the OTAR group through the connected subscriber. Although automatic population provides advantages in the mobile KVL, it may be used in any other KVL as well, such as a stationary key management device (i.e., a KMF).

Although a physical link provides the greatest amount of security, in other embodiments a short range wireless link such as a Bluetooth connection may be used. It is desirable in this case to provide a connection that is sufficiently short to guarantee simultaneous visibility of the KVL and the communication device. These may be located in a secure area outside of which the short range wireless connection between the KVL and connected subscriber is not likely to be overheard and in which all other devices are cleared to overhear the wireless connection if desired. Of course, additional security protocols may be used in when using a wireless link case.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Those skilled in the art will recognize that a wide variety of modifications, alterations, and combinations can be made with respect to the above described embodiments without departing from the spirit and scope of the invention defined by the claims, and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by any claims issuing from this application and all equivalents of those issued claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method to automatically associate a mobile communication device having a device identifier with a newly created first secure group established to provide security information between subscribers of the first secure group, the method comprising:
maintaining lists of a plurality of secure groups, their currently authorized subscribers, and each group's associated security information at a key variable loader;
receiving an identity of a newly created first secure group at the key variable loader via an external input interface of the key variable loader;
providing, via the key variable loader, a first group identifier for the first secure group at the key variable loader and associating the first group identifier with the received identity of the newly created first secure group;
setting a first key for the first secure group at the key variable loader, the first key associated with a corresponding encryption algorithm;
automatically downloading the device identifier of the mobile communication device to the key variable loader from the communication device over a short range connection connecting the communication device and the key variable loader; and
after downloading the device identifier, uploading, via the key variable loader, the first group identifier and the first key for the first secure group to the communication device via the short range connection for use in securing communications between currently authorized subscribers in the first group, and automatically updating a particular list associated with the first secure group out of the plurality of lists of secure groups maintained at the key variable loader to include the device identifier retrieved over the short range connection.

2. The method of claim 1, wherein the short range connection is a wired connection.

3. The method of claim 1, wherein the short range connection is a secure wireless connection with a range that is sufficiently short to guarantee simultaneous visibility of the key variable loader and the communication device.

4. The method of claim 1, further comprising generating the particular list associated with the first secure group at the key variable loader.

5. The method of claim 1, further comprising, after downloading the device identifier, providing the encryption algorithm, along with the first key, to the communication device from the key variable loader.

6. The method of claim 1, wherein the particular list is stored in the key variable loader and is maintained to comprise only currently authorized subscribers of the first secure group.

7. The method of claim 6, further comprising:
disconnecting the key variable loader from the communication device after having downloaded the device identifier and uploaded the first group identifier and first key;
reconnecting the key variable loader to the communication device after having disconnected the key variable loader from the communication device;
transmitting the particular list of currently authorized subscribers of the first secure group and a second key for the first secure group different from the first key from the key variable loader to the communication device; and
transmitting the second key from the communication device to other subscribers in the particular list of currently authorized subscribers of the first secure group over a wireless connection for use in securing subsequent wireless communications between currently authorized subscribers in the first group.

8. The method of claim 7, further comprising, prior to transmitting the particular list of currently authorized subscribers of the first secure group to the communication device, modifying the particular list of currently authorized subscribes for the first secure group at the key variable loader to remove one or more of the subscribers from the particular list who are no longer authorized subscribers for the first secure group.

9. The method of claim 7, further comprising the communication device transmitting the second key to other subscribers in the particular list of currently authorized subscribers of the first secure group over a radio interface.

10. The method of claim 9, wherein the particular list of currently authorized subscribers and the second key are both transmitted from the key variable loader to the communication device over a physical link between the key variable loader and the communication device.

11. The method of claim 1, the method further comprising:
receiving an identity of a second secure group at a key variable loader after disconnection of the communication device from the key variable loader via the external input interface of the key variable loader, the first and second secure groups having overlapping subscribers including the communication device;
providing, via the key variable loader, a second group identifier for the second group at the key variable loader and associating the second group identifier with the received identity of the second secure group;
setting a second key for the second secure group at the key variable loader, the second key associate with the corresponding encryption algorithm;
verifying the device identifier at the key variable loader after the communication device and the key variable loader have been reconnected via a second short range connection using the downloaded device identifier; and
after verifying the device identifier, uploading the second group identifier and the second key for the second secure group to the communication device via the second short range connection and automatically updating a second particular list associated with the second secure group out of the plurality of lists of secure groups maintained at the key variable loader to include the device identifier retrieved over the short range connection.

12. A method of providing security information between a mobile communication device and a first secure group established to provide security information between subscribers of the first secure group, the method comprising:
at a portable key variable loader:
maintaining lists of a plurality of secure groups, their group identifiers, their currently authorized subscribers, and each group's associated security information, the security information including keys and encryption algorithms associated with each secure group;
downloading a device identifier of a communication device through a first short range connection connecting the communication device and the key variable loader;
associating the downloaded device identifier with a first secure group out of the plurality of secure groups maintained at the portable key variable loader;
transmitting a first key to the communication device through a second short range connection connecting the communication device and the key variable loader for use in securing communications between currently authorized subscribers in the first group; and transmitting a particular list of currently authorized subscribers of the first secure group out of the plurality of lists of secure groups maintained at the key variable loader to the communication device; and at the communication device, further transmitting the first key to at least some subscribers set forth in the particular list of currently authorized subscribers of the first secure group over a wireless connection for use in securing communications between currently authorized subscribers in the first group.

13. The method of claim 12, wherein the key is wirelessly transmitted to the at least some subscribers set forth in the particular list of currently authorized subscribers of the first secure group while the communication device is simultaneously connected with the key variable loader through the second short range connection.

14. The method of claim 12, wherein the first and second short range connections are achieved over a wired connection.

15. The method of claim 12, further comprising transmitting the encryption algorithm from the key variable loader to the communication device over the second short range connection.

16. The method of claim 12, further comprising, at the communication device, further transmitting the first key, directly or indirectly, to all of the subscribers set forth in the particular list of currently authorized subscribers of the first secure group via the wireless connection for use in securing communications between currently authorized subscribers in the first group.

17. The method of claim 12, further comprising, prior to transmitting the particular list of currently authorized subscribers of the first secure group to the communication device, modifying the particular list of currently authorized subscribers for the first secure group at the key variable loader to remove one or more of the subscribers from the particular list who are no longer authorized subscribers for the first secure group; and the communication device refraining from further transmitting the first key to the one or more subscribers who are no longer authorized subscribers for the first secure group.

18. The method of claim 12, further comprising disconnecting the communication device from the key variable loader prior to the communication device further transmitting the first key to the at least some subscribers set forth in the particular list of currently authorized subscribers of the first secure group.

19. The method of claim 12, further comprising the first time the communication device is coupled to the key variable loader via the first short range connection, receiving an identity of the first secure group at the key variable loader via an external input interface of the key variable loader;

providing, via the key variable loader, a first group identifier for the first secure group at the key variable loader and associating the first group identifier with the received identity of the first secure group;

setting the first key for the first secure group at the key variable loader, the first key associated with a corresponding encryption algorithm.

20. The method of claim 12, further comprising a subsequent time the communication device is coupled to the key variable loader, and responsive to determining that one or more subscribers in the first group are no longer authorized:

transmitting a second key, different from the first key, from the key variable loader to the communication device through the second short range connection connecting the communication device and the key variable loader for use in securing subsequent wireless communications between subscribers in the first group; and transmitting the particular list of currently authorized subscribers of the first secure group out of the plurality of lists of secure groups maintained at the key variable loader to the communication device, modified so as to remove the one or more subscribers from the particular list; and at the communication device, further transmitting the first key to at least some subscribers set forth in the particular list of currently authorized subscribers of the first secure group, as modified, over the wireless connection for use in securing subsequent wireless communications between currently authorized subscribers in the first group.

* * * * *